United States Patent [19]

Réau

[11] 4,303,743
[45] Dec. 1, 1981

[54] AIR DEPOLARIZED CELL WITH A GELLED ELECTROLYTE

[75] Inventor: Jean-Marie Réau, Poitiers, France

[73] Assignee: Societe Anonyme dite: GIPELEC, Perret, France

[21] Appl. No.: 217,035

[22] Filed: Dec. 16, 1980

[30] Foreign Application Priority Data

Jan. 16, 1980 [FR] France .................. 80 00901

[51] Int. Cl.³ ........................................ H01M 12/06
[52] U.S. Cl. .................................... 429/27; 429/66; 429/190
[58] Field of Search .................. 429/27, 66, 190, 162, 429/164

[56] References Cited

U.S. PATENT DOCUMENTS

| | | | |
|---|---|---|---|
| 3,840,406 | 10/1974 | Depoix | 429/66 |
| 3,871,920 | 3/1975 | Gerbier et al. | 429/27 |
| 3,928,072 | 12/1975 | Gerbier et al. | 429/190 X |
| 4,009,320 | 2/1977 | Gerbier | 429/27 |
| 4,214,044 | 7/1980 | Chevet et al. | 429/27 |

FOREIGN PATENT DOCUMENTS

| | | |
|---|---|---|
| 2345473 | 4/1975 | Fed. Rep. of Germany . |
| 754802 | 11/1933 | France . |
| 2251109 | 6/1975 | France . |
| 65821 | 7/1972 | Luxembourg . |

*Primary Examiner*—Anthony Skapars
*Attorney, Agent, or Firm*—Kenyon & Kenyon

[57] ABSTRACT

The cell includes a positive electrode (3), a negative electrode (4) and an expansion space (15), the gelled electrolyte (5) being disposed between the two electrodes firstly in contact with their electrochemical exchange surfaces and secondly between the negative electrode (4) and the expansion space (15).

The surface (14) of the electrolyte (5) in the expansion space is covered partially with a plate (18) which exerts a pressure on the electrolyte (5), which pressure presses the electrolyte closely against the surfaces of the electrodes (3, 4).

4 Claims, 2 Drawing Figures

AIR DEPOLARIZED CELL WITH A GELLED ELECTROLYTE

FIELD OF THE INVENTION

The present invention relates to an air-depolarized cell with a gelled electrolyte. It is applicable more particularly to alkaline cells of this type, but it can also be used in air-depolarized saline cells.

BACKGROUND OF THE INVENTION

Among the problems encountered in designing these cells, there is that of storage before use or during long rest periods between discharges, as well as that of loss of capacity during slow-rate discharging. Of course, an air-depolarized cell must be accessible to air during discharge, but air must never come directly into contact with the negative electrode because this may cause a loss of usable capacity.

Various steps have therefore been taken to prevent air from oxidizing the negative active material. U.S. Pat. No. 3,840,406 discloses a negative electrode covered with a layer of electrolytic gel which protects it from the air contained in an expansion chamber provided in the upper portion of the cell to compensate for the increase in volume of the negative electrode during discharge. However, the oxygen in said space becomes dissolved in the electrolyte and comes into contact with the anode active material. It is therefore important that said space does not communicate with the outside, and steps have been taken to this effect in U.S. Pat. No. 4,214,044. These steps consist in limiting the space in consideration on the positive electrode side (and hence on the air intake side) by means of an air-tight wall.

However, it has been found that this disposition, although effective to some extent, is insufficient in some cases. Air entering through the immersed portion of the positive electrode can form pockets between the electrolyte and the wall of the positive electrode and is thus able to make cracks appear in the electrolytic gel. This phenomenon probably occurs because of the pressure drop caused in the expansion space above the electrolyte by the disappearance of the oxygen dissolved in the electrolyte and combined with the negative active material, or is due to variations in temperature or atmospheric pressure.

Preferred embodiments of the present invention remedy this drawback.

SUMMARY OF THE INVENTION

The present invention provides an air depolarized cell with a gelled electrolyte, said cell including a positive electrode, a negative electrode and an expansion space, the gelled electrolyte being disposed between the two electrodes firstly in contact with their electrochemical exchange surfaces and secondly between the negative electrode and the expansion space, the surface of the electrolyte in the expansion space being partially covered with a plate which exerts a pressure on the electrolyte, thereby pressing the electrolyte closely against the surfaces of the electrodes.

It is sufficient to provide enough pressure for the gel to rise very slightly above the level of the plate at the uncovered points to effectively prevent air from forming pockets.

It is necessary to leave part of the electrolyte's surface uncovered so that the electrolyte gel can pass through into the expansion space while the cell is discharging, under the effect of the pressure of the discharged anode active material. Preferably, the surface area of said uncovered part is equal to 5% to 40% of the electrolyte's surface area in the expansion space.

This may be obtained by providing a plate shaped like the surface of the electrolyte but having dimensions such that an uncovered border remains between the edges of the plate and some of the walls of the expansion space.

Alternatively a plurality of slots may be provided in the plate, in which case the plate may cover the whole surface of the electrolyte except for where there are slots, or else it may leave an uncovered border between its edges and the walls of the cell on the negative electrode side.

Of course, the plate must be fixed by any suitable means to the walls of the expansion space which are situated on the positive electrode side.

BRIEF DESCRIPTION OF THE DRAWINGS

The invention will be better understood from the detailed description of the following example given with reference to the accompanying drawings in which.

DETAILED DESCRIPTION

Figure 1:
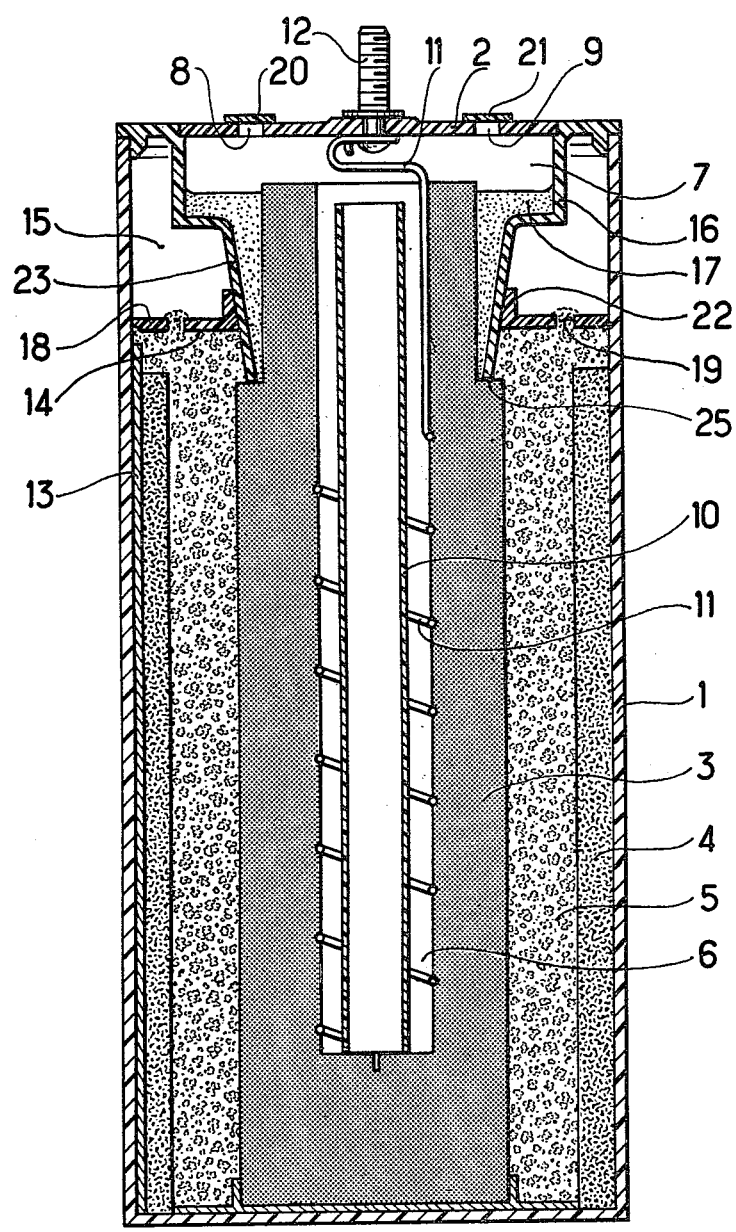
FIG. 1 illustrates a cross-section of an air-depolarized cell in accordance with the invention.

The cell illustrated in FIG. 1 has a casing made of thermoplastic material and constituted by a can 1 and a cover 2. Inside the casing, there is a central positive air-depolarized electrode essentially made of a catalytic carbon mass 3, and a zinc powder negative electrode 4 disposed against the side walls of the can 1. The annular space between the electrodes is filled by a gelled alkaline electrolyte 5 which also covers the upper part of the negative electrode. A ventilation circuit for the positive electrode includes a vertical ventilation duct 6 which passes through the mass 3 and opens into a ventilation chamber 7 situated immediately below the cover 2. The cover 2 has two openings 8 and 9 shown stopped by thermoplastic plugs 20 and 21 which must be removed to allow the cell to operate. The openings 8 and 9 then make the chamber 7 communicate with the outside atmosphere. This constitutes an oxygen supply for the positive electrode. An H section member 10 for promoting the flow of air in accordance with U.S. Pat. No. 3,871,920 is disposed in the duct 6. A metal wire 11 wound in a helix along the duct 6 and embedded in the mass 3 constitutes a current collector for the positive electrode and is connected to the positive terminal 12. The negative current collector is constituted by a metal wire 13 sunk in the electrode 4. The portion of the metal wire which passes through the cover 2 is not illustrated.

The free surface 14 of the electrolyte 5 is surmounted by a gas space 15 which compensates for the changes in volume due to variations in temperature and to the discharge process of the cell. In order to prevent the oxygen of the air from entering the space 15, where it could chemically oxidize the zinc powder of the negative electrode, the space 15 is separated from the ventilation chamber 7 by means of a wall impermeable to oxygen constituted by a thermoplastic part 16 covered with a layer of pitch 17.

Figure 2:
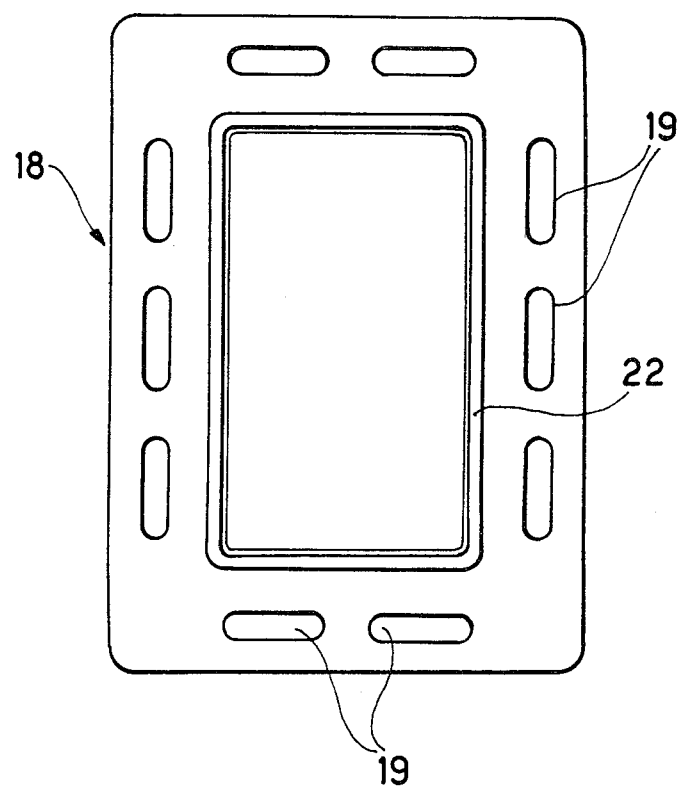
FIG. 2 illustrates a plan of the plate in accordance with the invention.

The part 16 is welded to the upper portions of the walls of the can 1, and the cover 2 is force fitted therein and may be glued thereto. The lower portion of the part 16 is immersed in the electrolyte and rests against a shoulder 25 of the electrode 3. A plate 18 in which there are firstly slots 19 and secondly a central hole with a rim 22 around it is force fitted on the part 16 so that its rim 22 fits closely round the portion 23 of the part 16 whose end is immersed in the electrolyte. The plate 18 is illustrated as seen from above in FIG. 2. This makes it possible to see the shape and the number of slots 19.

The position of plate 18 on the part 16 is such that it exerts a pressure on the surface 14 of the electrolyte which must rise through the slots 19 as illustrated in FIG. 1. In the example described, this position is fixed by the oblique shape of the portion 23 of the part 16, whose end is immersed in the electrolyte. The rims 22 are also flared to correspond exactly with the shape of the portion 23.

In the example illustrated, there are ten slots 19 and their total surface area is 3.3 cm$^2$, while the surface area of the electrolyte is 22.8 cm$^2$. The ratio between the free surface area and the total surface area of the electrolyte is therefore about 14.5%. The electrolyte gel is formed by a 7 N solution of potassium hydroxide gelled by 240 to 255 grams per liter of potato starch. The gel is firmly held against the surfaces of the electrodes due to the pressure exerted by the plate 18 and, since it can no longer come off the surface of the positive electrode, prevents gas bubbles from forming even when the pressure in the space 15 is lower than the pressure in the space outside it.

Alternatively, to be held in the required position, the plate 18 can be glued to the part 16, or it even can be welded thereto by ultrasonic welding. The plate 18 may be made of polystyrene or of any other sufficiently rigid thermoplastic material.

If the part 16 is connected to the electrode 3 by a prismatic or cylindrical portion, the plate 18 can be maintained at the required height by providing ribs on this portion which prevent the plate from rising above the required position.

As set forth hereinbefore, instead of providing a plate 18 with slots 19, it is possible to use a plate without slots but only with the central hole round the part 16, in which case the dimensions of the plate must be slightly smaller than the surface area of the electrolyte so that there remains a border of uncovered electrolyte between the outer edge of the plate and the wall of the can 1.

I claim:

1. An air depolarized cell with a gelled electrolyte, said cell including a positive electrode, a negative electrode and an expansion space, the gelled electrolyte being disposed between the two electrodes firstly in contact with their electrochemical exchange surfaces and secondly between the negative electrode and the expansion space, the surface of the electrolyte in the expansion space being partially covered with a plate which exerts a pressure on the electrolyte thereby pressing the electrolyte closely against the surfaces of the electrodes.

2. A cell according to claim 1, wherein the surface area left uncovered by the plate is equal to 5% to 40% of the electrolyte's surface area in the expansion space.

3. A cell according to claim 1 or 2, wherein said plate is shaped like the electrolyte's surface in the expansion space and has slots in it above said surface.

4. A cell according to claim 1 or 2, wherein said plate is shaped like the electrolyte's surface in the expansion space but is of smaller size such that it leaves an uncovered border between the plate and the walls of the cell on the negative electrode side.

* * * * *